April 17, 1962  J. W. MILLER  3,030,280
PHOTOMETRIC-COULOMETRIC BROMINE NUMBER TITRATOR
Filed March 14, 1958  2 Sheets-Sheet 1

INVENTOR.
J. W. MILLER
BY
Hudson & Young
ATTORNEYS

INVENTOR.
J.W. MILLER

BY
Hudson & Young
ATTORNEYS

United States Patent Office 3,030,280
Patented Apr. 17, 1962

3,030,280
PHOTOMETRIC-COULOMETRIC BROMINE
NUMBER TITRATOR
John W. Miller, Bartlesville, Okla., assignor to Phillips Petroleum Company, a corporation of Delaware
Filed Mar. 14, 1958, Ser. No. 721,566
9 Claims. (Cl. 204—1)

This invention relates to method and apparatus for use in determining the bromine number of solutions. In one specific aspect it relates to an improvement in the method and apparatus for determining the end point of a titration wherein the bromine number of an olefin is to be determined.

The bromine number may be defined as the number of grams of bromine that react with 100 grams of a sample under prescribed conditions. It can be used as a measure of the olefinic unsaturation in petroleum distillates. The reaction involved in reacting the bromine is a titration and as such the end point must be determined.

Bromine numbers are presently determined by either ASTM method D–1158 (colorimetric) or method D–1159 (electrometric). In the colorimetric procedure, an excess of standard bromide-bromate solution is added to a flask containing the sample. After an empirically adjusted time of reaction the excess bromine is titrated iodometrically. This method requires considerable operator time. Irregular results are obtained for both branched chain olefins and conjugated diolefins. Samples containing large quantities of branched chain olefins may deviate from the theoretical bromine number to a considerable extent.

The electrometric procedure of D–1159 is a direct titration with standard bromate-bromide solution until the electric eye specified for use therein remains open for 30 seconds upon the addition of two drops of reagent. In developing this method the end point was empirically selected after the titration of a large number of olefins. Only conjugated diolefins give irregular results because of the addition of more than one mole of bromine. Although the electrometric procedure may be used for rapid routine analyses, the empirically adjusted end point is undesirable when a mixture containing several olefin types is to be analyzed.

The instant invention is designed to eliminate the use of empirical data in the determination of bromine numbers, and to provide data in a form from which the number can readily be computed.

Broadly, the instant invention involves using a constant current for the electro-generation of bromine from a solution (in the presence of an olefin) while employing an optical analyzer to follow the titration and automatically recording the results thereby observed. As the titration proceeds the liquids become yellower. A standard solution of a three to one mixture of glacial acetic acid and methanol with a small quantity of potassium bromide and hydrochloric acid added is used as a source of the bromine. Mercuric chloride is employed as a catalyst.

It is an object of this invention to provide a method and apparatus for determining the end points of a titration. It is also an object to determine such an end point in the titration of olefinic materials by providing data from which the bromine number can be computed. Another object is to accomplish these means automatically by employing optical analyzer means. Other objects, advantages and features will become apparent from the following disclosure.

Figure 1:
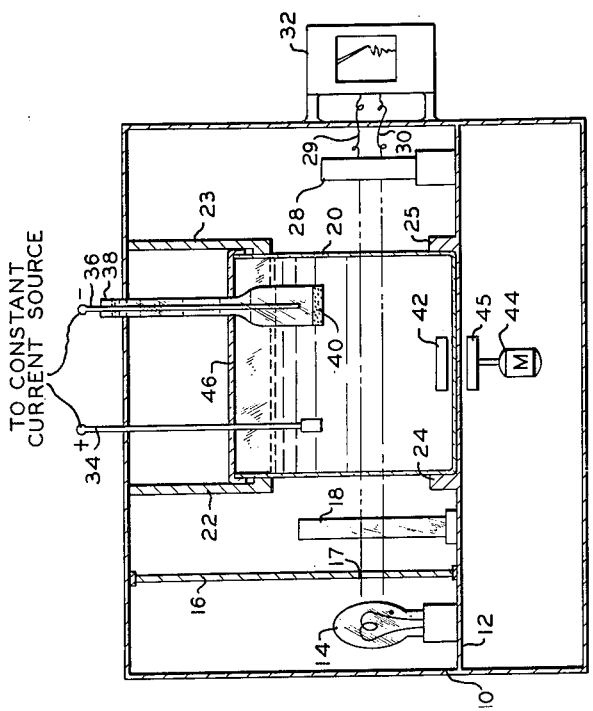
FIGURE 1 shows schematically the arrangement of apparatus for practicing the instant invention.

Referring now to FIGURE 1, there is shown an enclosure 10 which is preferably light-proof having therein a support member 12. On the support are disposed a radiation source 14, an opaque wall 16 having therein a slit 17, a radiation filter 18 and a Berzilius beaker 20. The beaker is held in place by upper support members 22 and 23 and lower support members 24 and 25. In line with the apparatus mentioned is a detector or photocell 28 which is connected by leads 29 and 30 to a recorder 32.

Within the beaker is a mixture of a standard solution (which will be described below) and the material to be analyzed. Bromine is generated from the standard solution by passing a constant current between electrodes that comprise the anode 34 and the cathode 36. The electrodes 34 and 36 are connected to a constant current source. The cathode is enclosed in a container 38 of inert material, for example glass, and has at the bottom thereof a sintered porous disk 40. A magnetic stirrer comprising a stirring element 42 (preferably a bar magnet) and a stirring motor 44 driving a magnet 45 is disposed at the bottom of the assembly. A lid 46 supports the electrodes and the cathode container in the solution within beaker 20.

Figure 2:
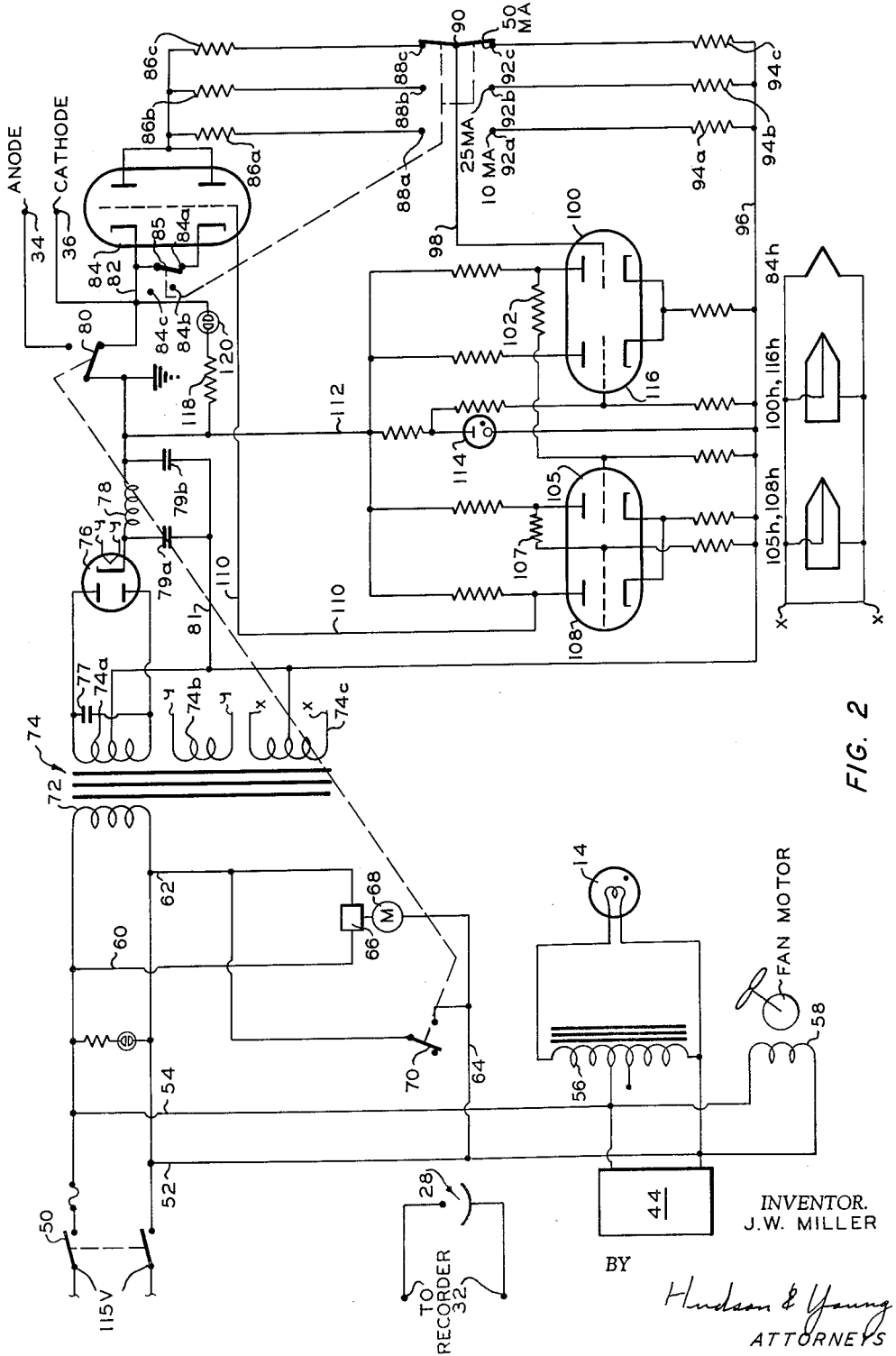
FIGURE 2 shows schematically a diagram of a constant current source to be used in conjunction with the apparatus of FIGURE 1.

Referring now to FIGURE 2 there is shown an arrangement to provide the anode and cathode with a constant current. A calibrated battery could be used instead but is subject to the defect that its voltage would continuously decrease and therefore introduce a slight error over the periods of operation of the instrument. A switch 50 connects the circuit of FIGURE 2 to an alternating current source. Leads 52 and 54 provide A.C. to a transformer 56 which provides current to the mercury vapor lamp which comprises the radiation source 14 of FIGURE 1. Power is taken directly from the leads 52 and 54 to a fan motor 58. The fan is used for cooling the radiation source 14. Connected in parallel with the motor 58 is the magnetic stirrer motor 44. Leads 60, 62 and 64 provide alternating current to the assembly of clutch 66 and a clock motor 68. A switch 70 is provided to make one of the contacts for this circuit. The clutch and motor assembly is a commercially available unit wherein the clock motor is set to render the clutch mechanically capable of transmitting power after a desired period of time. This permits the starting of the chart motor in the recorder, as will be hereinafter described.

The alternating current from switch 50 is applied to transformer 72, the secondary coil 74a of which is connected to the anodes of a double diode 76. A capacitor 77 is connected across the anodes. The rectified output from the diode is fed through a filter comprising coil 78 and capacitors 79a and 79b to a switch 80, thence to the anode 34. The switch 80 is ganged to the switch 70. There is a connection from one side of the filter to the center tap of coil 74a via lead 81. The cathode 36 is connected to a lead 82 which is in turn connected to the anodes of a double triode 84 having one of the anodes connected by contactor 85 through the contacts 84a. The cathodes of the tube 84 are connected to resistors 86a, b, and c which are arranged in parallel between the tube and switch contacts 88a, b, and c. The contacts 88b and c serve to cut out anode potential to one of the triodes of tube 84. A contactor 90 serves to connect the respective contacts with a second set thereof denoted as contacts 92a, 92b, and 92c. The contactor 90 is ganged to the contactor 85. The resistors 94a, b, and c provide connections between three respective contacts and lead 96, which is connected to the center tap of secondary winding 74a. The construction of 88, 90 and 92 in essence comprises a voltage divider.

A lead 98 is connected to the contactor 90 and provides a control signal to the grid of triode 100. The output from tube 100 is taken from the anode of this tube through a resistor 102 and fed to the control grid of a triode 105. The output from triode 105 is fed through a resistor 107 to the control grid of a triode 108 and the output from the latter is fed via a lead 110 to the control grids of the triode 84. Power is provided to the anodes of the respective tubes through the lead 112. A voltage regulator tube 114 is connected between the power lead 112 and the control grid of a triode 116. The cathode of the triodes 116 and 100 are common, hence the output of 100 represents a differential signal. A resistor 118 in series with a voltage regulator 120 are connected in parallel around the switch 80, and the electrodes 34, 36. The circuit is grounded at switch 80.

Another transformer secondary coil, 74b, heats the cathode of diode 76. The connections are denoted as Y—Y in FIGURE 2.

Another secondary coil, 74c, is connected to the tube heaters 84h, 100h, 105h, 108h and 116h at points X—X as shown in FIGURE 2. The circuit is shown as such for clarity and is a conventional means for providing the power necessary for heating.

The operation of the constant voltage circuit is initiated by closing the switch 50, whereupon alternating current (A.C.) is impressed on the transformer 74. The secondary coils 74b and 74c heat the cathodes of their respective tubes. The coil 74a provides A.C. to the rectifier (diode 76) and the D.C. thus produced is filtered by coil 78, uniform direct capacitors 79a and 79b, to provide current to the titrator electrodes and the rest of the circuit.

After the circuit warms up, the ganged switches 70 and 80 are closed and current passes to the electrodes 34 and 36. The latter current, plus that through the regulator 120 then pass to the anode(s) of triode 84, which is part of a stabilizing circuit that is designed to correct for current fluctuations. The current that can flow between 34 and 36 must, in turn, flow through the triodes 84, and the current through the latter is controlled by the voltage on its control grid. In the arrangement shown, this control grid voltage is derived from amplifications of the fluctuations in voltage (hence in current, assuming the resistance of the stabilizing circuit stays the same).

This is accomplished by providing a regulated, or control voltage from lead 112 through regulator 114 to the grid of triode 116. The electrode voltage (somewhat stabilized by the action of the regulator 120) appears on the grid of the triode 100 (having passed through the triode 84, a resistor 86, and the lead 98). These two voltages control the currents that flow from the respective anodes to the common cathode. These currents buck each other in the cathode circuit, and since 116 is a regulated, i.e., constant, voltage, the difference is sensed at the anode of 100 by the latter's ability or inability to pass current from its own anode to its cathode. The differential output appears across resistor 102 because the potential thereon is likewise determined by triode 100 and triode 116. This differential signal is then amplified in two stages (triodes 105 and 108) and then is impressed as a control voltage on the grid of triode 84.

The result is, if the electrode current rises, the differential across triodes 116 and 100 increases and the bias on the grid of tube 84 is changed to reduce current flow therethrough.

In the construction of the foregoing apparatus radiation source 14 can be any suitable source of electromagnetic radiation, but is preferably a 100 watt mercury vapor lamp. The filter 18 is preferably one having peak transmissibility at a wave length of 365 millimicrons. The detector 28 is preferably a photo-emissive cell or may be a photovoltaic cell of the type called a "solar battery" such as described in U.S. Patent 2,780,765. The recorder 32 may be a Sargent Laboratory Recorder A-72150 as described in "Scientific Apparatus and Methods," vol. 10, #1, copyright 1958, published by Sargent Laboratories. The recorder should have a 0 to 250 millivolt range. The anode 34 comprises a piece of platinum foil and the cathode 36 comprises a piece of platinum wire.

PROCEDURES AND OPERATION

A standard solution is provided in the beaker 20 to which is added a measured quantity of the olefinic material to be analyzed. This solution is prepared by adding 100 ml. of the generating electrolyte and 8 ml. 15 percent methanolic mercuric chloride to the Berzilius beaker 20 and filling the cathode compartment 38 with 1 N hydrochloric acid. The generating electrolyte solution is prepared by adding 16 ml. of concentrated hydrochloric acid and 50 ml. of 40 percent (by weight) aqueous potassium bromide, to a mixture of 650 ml. of glacial acetic acid and 250 ml. of methanol. The aqueous potassium bromide (40 percent) is prepared by dissolving 100 grams potassium bromide in 250 ml. of water. The methanolic mercuric chloride (15 percent) is prepared by dissolving 30 grams of mercuric chloride in 250 ml. of methanol.

The sides of the beaker 20 are dried and polished with lens tissue prior to emplacing in the supports 22–25.

In the operation of the apparatus the standard solution is measured into the beaker 20. The cover and the electrodes 34 and 36 are put in place, the stirring motor 44 is started and the electrodes are connected to the constant current source by connecting contactor 90 across one pair of contacts 88, 92. The pen of recorder 32 is moved to a conventional position near the bottom of the scale on the recorder. Then a measured amount of sample is added to the solution in the beaker 20. The amount of this sample will vary with the material selected just as will the current applied. The following procedure for sample preparation and sample sizes are recommended:

A quantity of the sample is weighed into a 10-ml. volumetric flask and diluted to the mark with carbon tetrachloride. Choose the size of sample to be weighed into the flask according to the anticipated bromine number. The sample sizes are.

| Bromine number: | Sample size, g. |
| --- | --- |
| 0–20 | 1.5 |
| 20–50 | 0.4 |
| 50–100 | 0.2 |
| 100–200 | 0.13 |

Figure 3:
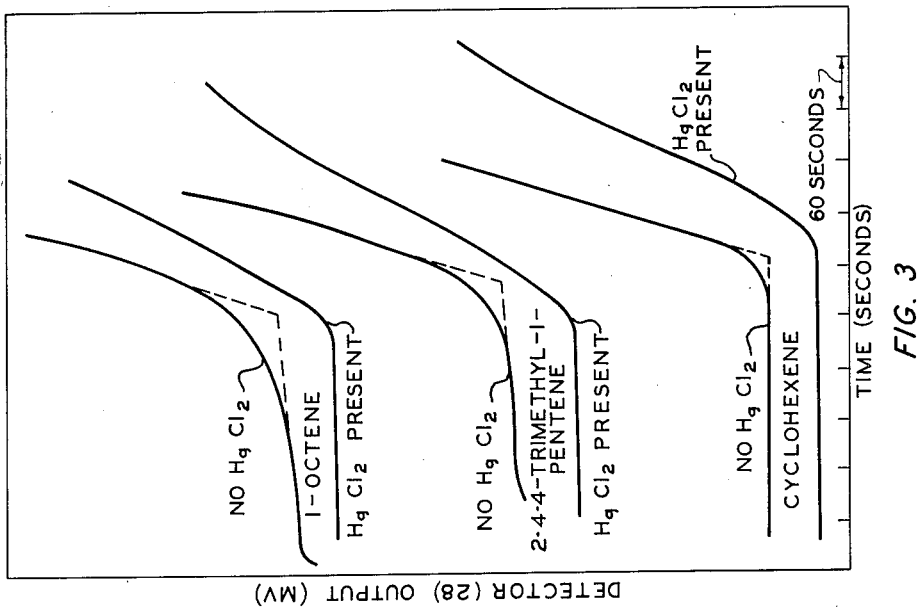
FIGURE 3 shows a typical diagram achieved by the method and apparatus set forth.

As the titration continues a curve such as shown in FIGURE 3 will be generated on the chart. The horizontal portions (i.e. time axes) of these curves are approximately parallel with the chart drive. As the titration initially starts, examination of the curves shows that there is normally no change in the color of the solution. As the titration approaches the end point, which is denoted by the break from the horizontal, the color begins to change, becoming increasingly more yellow. The amount of terminal olefins determines the extent of rounding off or break of the curve generated. Once the break has occurred the reaction is allowed to proceed until it appears that a straight portion has been generated on the chart. Once this is apparent the device can be turned off and the operator can then take his data and compute the bromine number.

The computations are as follows:

(1) Milligrams of Bromine
$$= \frac{[\text{Time (sec.)}][\text{current (amp.)}]\, 79.16}{96.5}$$

(2) $\text{Bromine No.} = \frac{\text{mg. bromine} \times 100}{\text{sample weight (mg.)}}$ The time for Equation 1 is taken from the chart of FIGURE 3. This is obtained by extrapolating the flat portions of the curves until they intersect as is shown by the dotted lines on this figure. This, then, is the end point. The current for Equation 1 is taken from the setting of the switch 90; since a constant current is provided, it is not necessary to compensate for variation thereof with time.

The clock motor 68 of FIGURE 2 is used when the titration is known to take a considerable time. In such case, the titration is started, but the recorder chart motor is not started until a period of time selected by the operator has passed. This elapsed, non-recording time is indicated by the clock and is added to the time indicated on the chart.

Cyclohexane and 2,4,4-trimethyl-1-pentene were purified by the ASTM silica gel chromatographic procedures D-1158-55T and D-1159-55T, November 1956, and were titrated with this instrument. Three samples of each compound were weighed and titrated. The results are given in Table I. These results indicate that the accuracy and the precision of the method are excellent and well within the limits of the ASTM procedure.

The presence of the mercuric chloride catalyst has been known to give high results with certain olefinic materials. For this reason a number of pure olefins were titrated both in the presence and in the absence of catalyst. The results are presented in Table II. The difference in the bromine numbers in the presence and in the absence of catalyst was within the experimental error of the method except for 4-methyl-1-pentene. The shape of the titration curves showed the effect of the catalyst. In the presence of catalyst, normal curves were obtained for most compounds. However, in the absence of catalyst 4-methyl-1-pentene gave a curve (not shown) which rapidly increased in absorbance at first and then increased more slowly until the break. It was possible to carry out an extrapolation for 4-methyl-1-pentene with fair accuracy. The lower result is attributed to a slower reaction rate.

*Table I*

BROMINE NUMBERS OF CYCLOHEXENE AND 2,4,4-TRIMETHYLPENTENE-1

| Compound | Bromine number | | |
|---|---|---|---|
| | Sample #1 | Sample #2 | Sample #3 |
| Cyclohexene (theoretical Br₂ No. 194.6) | 192.7 / 192.4 | 192.9 / 193.1 | 192.4 / 192.2 / 191.7 |
| Average | 192.5 | 193.0 | 192.1 |
| Deviation from theoretical | −2.1 | −1.6 | −2.5 |
| Percent dev. (dev.)/194.6 | −1.1 | −0.8 | −1.3 |
| 2,4,4-trimethylpentene-1 (theoretical Br₂ No. 142.4) | 140.6 / 139.0 | 140.0 / 141.6 | 139.5 / 141.6 / 141.6 |
| Average | 139.8 | 141.0 | 140.9 |
| Deviation from theoretical | −2.6 | −1.4 | −1.5 |
| Percent dev. (dev.×100)/142.4 | −1.8 | −1.0 | −1.1 |

*Table II*

TITRATION OF API (PURE) OLEFINS WITH ELECTRO GENERATED BROMINE

| | Bromine number | | | Deviation | |
|---|---|---|---|---|---|
| | Theory | No HgCl₂ | Found HgCl₂ | No HgCl₂ | HgCl₂ |
| Type I olefins (R₁CH=CH₂): | | | | | |
| (a) Unbranched: 1-Octene [1] | 142.4 | 140.7 | 141.2 | −1.7 | −1.2 |
| (b) Branched: | | | | | |
| 4-Methyl-1-pentene | 190.0 | 179.8 | 192.0 | −10.2 | +2.0 |
| 3-ethyl-1-pentene | 163.0 | [3] | 160.5 | | −2.5 |
| Type II olefins (CH₂=CR₁R₂): 2,2,4-trimethyl-1-pentene [2] | 142.4 | 144.2 | 144.2 | +1.8 | +1.8 |
| Cyclic olefins: Cyclohexene [2] | 194.6 | 195.1 | 195.1 | +0.5 | +0.5 |

[1] Phillips research grade.
[2] Purified by ASTM procedure D-1158-55T.
[3] No break in titration curve, which was similar to blank.

A simple filter photometer and procedures for operation thereof have been provided to detect the end point in titrations of olefinic materials with electro-generated bromine. The effect of a mercuric chloride catalyst, although small, improves the accuracy. An exception to the effect of this catalyst are catalytic cracked gasolines. Studies have shown the results to be reproducible within the degree of accuracy desired (see Table I).

Three factors which affect the sharpness of the break in the photometric titration curve are (a) the rate of bromine generation, (b) the wavelength used for the absorbance measurements, and (c) the rate of bromination of the olefins. The greater the rate of bromine generation, the sharper will be the break in the titration curve. With the present operating conditions, a current 50 of ma. has proven satisfactory for all samples. If the wavelength is varied toward shorter wavelengths, the sharpness of the break increases. With a Pyrex beaker the shortest useable wavelength is 320 m$\mu$. However, the high absorbance of the mercuric chloride catalyst in this region limits the useable wavelength to 360 m$\mu$ for the detection of excess bromine. At this wavelength a generation rate of 50 ma. gives a sufficiently sharp break so that the extrapolation procedure can be carried out with good precision. As the rate of bromine generation and the wavelength were kept constant throughout all the analyses, only the rate of addition of bromine to the olefins determined the shape of the titration curve.

The foregoing description demonstrates that the instant use of electro-generated bromine offers an improved method for the determination of bromine numbers. This photometric end point method has several advantages: (1) The trouble caused by electrical coupling between current or potential indicating electrodes and the generating circuit in automatic coulometric titrations is eliminated since the indicating electrodes are eliminated. (2) The dependence of the extinction coefficient on wavelength permits a degree of selectivity which is not present in other end point methods. The preferred wavelength is ultraviolet in the range of 360–365 m$\mu$. The sensitivity can be varied simply by variation in the filters 18 used, or in the wavelength setting. (3) The exact end point in titrations which are slow in the vicinity of the end point can be determined by extrapolation of the linear portions of the titration curve before and after the end point. (4) The recorded curve allows the immediate detection of any sample that fails to react in the proper manner. In this way a false end point will not be employed to calculate the results. Finally, (5) substitution reactions are minimized by generating bromine at a rate in the region of the rate at which addition reactions occur, i.e., by maintaining a low "free bromine" concentration.

The new method offers not only increased accuracy and precision, but also a decrease in the amount of time per analysis.

I claim as my invention:

1. An apparatus for determining the end point of a titration which comprises the combination of an ultraviolet radiation generator, a sample cell, an anode and cathode disposed in said sample cell, means for detecting ultraviolet radiation, means for recording a signal generated by said means for detecting in response to radiation impinging on the latter, means for passing a beam of radiation from said source through said sample cell to said means for detecting, and means for flowing direct current at a constant rate from said anode to said cathode.

2. An apparatus for determining the end point of a titration which comprises the combination of an ultraviolet radiation generator; means to filter ultraviolet radiation to remove predetermined wave lengths therefrom; a sample cell; an anode and cathode disposed in said sample cell; a compartment bottom surrounding said cathode; a first magnet placed on the inside of the bottom of said sample cell; means for detecting ultraviolet radiation; means for recording a signal generated by said means for detecting in response to radiation impinging on the latter; means for passing a beam of radiation from said source through said means for filtering through said sample cell to said means for detecting; a rotary motor; a second magnet driven by said motor and disposed outside said sample cell opposite said first magnet; and means for flowing current at a constant rate from said anode to said cathode.

3. Apparatus to determine the end point of a titration by photometric analysis which comprises the combination of an ultraviolet radiation generator; a sample cell; an ultraviolet radiation detector; a recorder; means for passing a beam of radiation of selected wave length from said source through said cell to said radiation detector; means for actuating said recorder responsive to the radiation impinging on said detector; two electrodes within said sample cell; a standard solution containing bromine values in contact with one of said electrodes within said sample cell; and means for flowing current at a constant rate from one of said electrodes to the other of said electrodes.

4. The apparatus of claim 3 wherein one of said two electrodes comprises a platinum plate.

5. The apparatus of claim 3 wherein one of said two electrodes is surrounded by an impermeable wall having a porous member across the lower end thereof.

6. The apparatus of claim 3 wherein one of said two electrodes comprises a platinum wire disposed within a chamber having a porous member at the bottom thereof.

7. The apparatus of claim 6 wherein said platinum wire comprises a cathode.

8. A process for determining the end point of a titration comprising (1) providing a standard solution by mixing 650 milliliters of glacial acetic acid with 250 milliliters of methanol, adding 16 milliliters of concentrated hydrochloric acid and 50 milliliters of 40 weight percent of aqueous potassium bromide thereto, withdrawing 100 milliliters from the mixture of the aforesaid four ingredients, adding 8 milliliters of 15 percent methanolic mercuric chloride to said 100 milliliters of said mixture, and placing the resulting mixture in a sample cell;

(2) initiating a substantially constant flow of direct current in said mixture in said sample cell to generate bromine;

(3) passing said flow of direct current through a layer of dilute hydrochloric acid;

(4) adding to said mixture in said sample cell a measured quantity of the material to be analyzed while maintaining said flow of direct current substantially constant;

(5) passing a beam of ultraviolet radiation through said mixture in said sample cell while continuing to maintain said flow of direct current substantially constant;

(6) detecting the ultraviolet radiation transmitted through said mixture in said sample cell;

(7) producing a signal proportional to the thus detected ultraviolet radiation; and (8) continuously recording said signal until after a surplus of bromine over that required for the titration has been generated.

9. A process for determining the end point of a titration comprising providing a standard solution having bromine values therein; initiating a flow of direct current through said standard solution to generate bromine; adding to said standard solution a measured quantity of material to be analyzed while maintaining said flow of direct current constant; continuing to maintain said flow of direct current constant through the mixture thus formed while passing a beam of ultraviolet radiation through the mixture to a detector sensitive thereto; and charting the ultraviolet radiation received at said detector in response to the signal generated by the detector upon receiving radiation.

References Cited in the file of this patent
UNITED STATES PATENTS

| | | |
|---|---|---|
| 2,161,453 | Busby | June 6, 1939 |
| 2,621,671 | Eckfeldt | Dec. 16, 1952 |
| 2,656,845 | Linsay | Oct. 27, 1953 |
| 2,744,061 | De Ford | May 1, 1956 |
| 2,812,242 | Krasl et al. | Nov. 5, 1957 |
| 2,832,734 | Eckfeldt | Apr. 29, 1958 |
| 2,928,774 | Leisey | Mar. 15, 1960 |
| 2,928,775 | Leisey | Mar. 15, 1960 |

OTHER REFERENCES

Analytical Chem., vol. 19, No. 3, March 1947 (article by Sease et al.).

Wise et al.: Analytical Chemistry, vol. 25, pages 1344–8.